US010360152B2

United States Patent
Ryu et al.

(10) Patent No.: US 10,360,152 B2
(45) Date of Patent: Jul. 23, 2019

(54) DATA STORAGE DEVICE AND DATA PROCESSING SYSTEM HAVING THE SAME

(71) Applicant: Samsung Electronics Co., Ltd., Suwon-si, Gyeonggi-do (KR)

(72) Inventors: Seung Chul Ryu, Hwaseong-si (KR); Bum Seok Yu, Suwon-si (KR); Chan Ho Yoon, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 14 days.

(21) Appl. No.: 15/654,911

(22) Filed: Jul. 20, 2017

(65) Prior Publication Data

US 2018/0024927 A1    Jan. 25, 2018

(30) Foreign Application Priority Data

Jul. 25, 2016 (KR) .................... 10-2016-0094372

(51) Int. Cl.
| | |
|---|---|
| *G11C 7/00* | (2006.01) |
| *G06F 12/0831* | (2016.01) |
| *G06F 21/78* | (2013.01) |
| *H04L 9/32* | (2006.01) |
| *G06F 21/85* | (2013.01) |
| *G06F 3/06* | (2006.01) |
| *G06F 12/14* | (2006.01) |

(52) U.S. Cl.
CPC .......... *G06F 12/0831* (2013.01); *G06F 21/78* (2013.01); *G06F 21/85* (2013.01); *H04L 9/32* (2013.01); *H04L 9/3226* (2013.01); *G06F 3/0622* (2013.01); *G06F 12/1408* (2013.01); *G06F 2221/2107* (2013.01); *G06F 2221/2125* (2013.01)

(58) Field of Classification Search
CPC ...... G06F 12/0831; G06F 12/78; G06F 12/85; H04L 9/32; H04L 9/3226
USPC ............. 365/189.05, 189.01, 189.04; 714/45
See application file for complete search history.

(56) References Cited

U.S. PATENT DOCUMENTS

| | | | |
|---|---|---|---|
| 6,142,683 | A | 11/2000 | Madduri |
| 7,080,283 | B1 | 7/2006 | Songer et al. |
| 7,334,173 | B2 | 2/2008 | Morgan et al. |
| 7,886,150 | B2 | 2/2011 | Stollon et al. |
| 7,906,983 | B2 | 3/2011 | Fulks, III |
| 8,276,199 | B2 | 9/2012 | Xu |
| 8,539,292 | B2 | 9/2013 | Nieuwland et al. |

(Continued)

*Primary Examiner* — Connie C Yoha
(74) *Attorney, Agent, or Firm* — Harness, Dickey & Pierce, P.L.C.

(57) ABSTRACT

A data storage device and a data processing system having the same are disclosed. The data storage device includes a nonvolatile memory and a controller, coupled to the nonvolatile memory, configured to receive first and second commands generated by a host and control an operation of the nonvolatile memory in response to the first command. The controller includes a core configured to receive and process the first command, a trace circuit corresponding to the core and configured to generate and output first data, based on pieces of information generated while the core processes the first command, and a trace controller configured to control output of the first data and second data differing from the first data, based on a result of performing at least one authentication control operation corresponding to the second command.

20 Claims, 11 Drawing Sheets

(56) References Cited

U.S. PATENT DOCUMENTS

| | | |
|---|---|---|
| 8,601,321 B2 | 12/2013 | Feng |
| 9,038,070 B2 | 5/2015 | Lippett et al. |
| 9,274,169 B2 | 3/2016 | Lingannagari et al. |
| 9,330,268 B2 | 5/2016 | Yoon |
| 9,524,227 B2 * | 12/2016 | Opferman ............ G06F 9/30145 |
| 2005/0289400 A1 * | 12/2005 | Kimura ............... G06F 11/3636 |
| | | 714/45 |
| 2006/0282734 A1 | 12/2006 | Milne et al. |
| 2009/0089626 A1 * | 4/2009 | Gotch ................. G06F 11/3476 |
| | | 714/45 |
| 2009/0276844 A1 | 11/2009 | Gehrmann et al. |
| 2010/0088760 A1 | 4/2010 | Greb et al. |
| 2012/0066552 A1 * | 3/2012 | Gilkerson ........... G06F 11/3471 |
| | | 714/45 |

\* cited by examiner

DATA STORAGE DEVICE AND DATA PROCESSING SYSTEM HAVING THE SAME

CROSS-REFERENCE TO RELATED APPLICATIONS

This application claims priority under 35 U.S.C. § 119(a) from Korean Patent Application No. 10-2016-0094372 filed on Jul. 25, 2016, the disclosure of which is hereby incorporated by reference in its entirety.

BACKGROUND

Example embodiments of the inventive concepts relate to a data storage device, and more particularly, to a data storage device and a data processing system having the same.

As a method for analyzing the operation of processors provided in a system, such as System On Chip (SOC) or an embedded system, or for correcting errors occurring in the processors, a trace operation is performed.

A trace operation is the operation of storing various types of information from a target processor in a memory device while the target processor is operating, and allowing a user to check the information stored in the memory device after the operation has been terminated.

Such trace data can be stored in a memory provided in a system. However, due to size constraints of the memory, traced data is limited, and a scheme for storing trace data outside the system has been used to overcome such memory size constraints.

However, when trace data generated in the system is stored in external equipment or an external memory, principal data or information related to processors may be exposed to the outside of the system.

Therefore, the security of trace data that is output from the system to the outside thereof is desired.

SUMMARY

According to some example embodiments of the inventive concepts, there is provided a data storage device including a nonvolatile memory, and a controller configured to receive first and second commands generated by a host and control an operation of the nonvolatile memory in response to the first command. The controller includes a core configured to receive and process the first command, a trace circuit corresponding to the core and configured to generate and output first data, based on pieces of information generated while the core processes the first command, and a trace controller configured to control output of the first data and second data differing from the first data, based on a result of performing at least one authentication control operation corresponding to the second command.

According to other example embodiments of the inventive concepts, there is provided a data processing system including a host and a data storage device connected to the host. The data storage device includes a nonvolatile memory, and a controller configured to receive a command generated by the host and control an operation of the nonvolatile memory in response to the command. The controller includes a core configured to receive and process the command, a trace circuit configured to correspond to the core and to perform a trace operation on the core in real time during an operation of the core, and a trace controller configured to control the trace operation of the trace circuit, based on a result of performing at least one authentication control operation corresponding to the command.

According to other example embodiments of the inventive concepts there is provided a controller for a data storage device with a trace circuit configured to generate trace data, an authentication control circuit configured to receive authentication information from a host and output a control signal, and an encryptor/decryptor. The encryptor/decryptor is configured to receive and encrypt the trace data, output the encrypted trace data to a memory, receive the encrypted trace data from the memory, decrypt the encrypted trace data received from the memory, determine whether the control signal is valid and output one of the encrypted trace data received from the memory and the decrypted trace data based on a result of the determination.

BRIEF DESCRIPTION OF THE DRAWINGS

The above and other features and advantages of the inventive concepts will become more apparent by describing in detail non-limiting example embodiments thereof with reference to the attached drawings in which.

DETAILED DESCRIPTION

Hereinafter, example embodiments of the inventive concepts will be described in detail with reference to the attached drawings.

Figure 1:
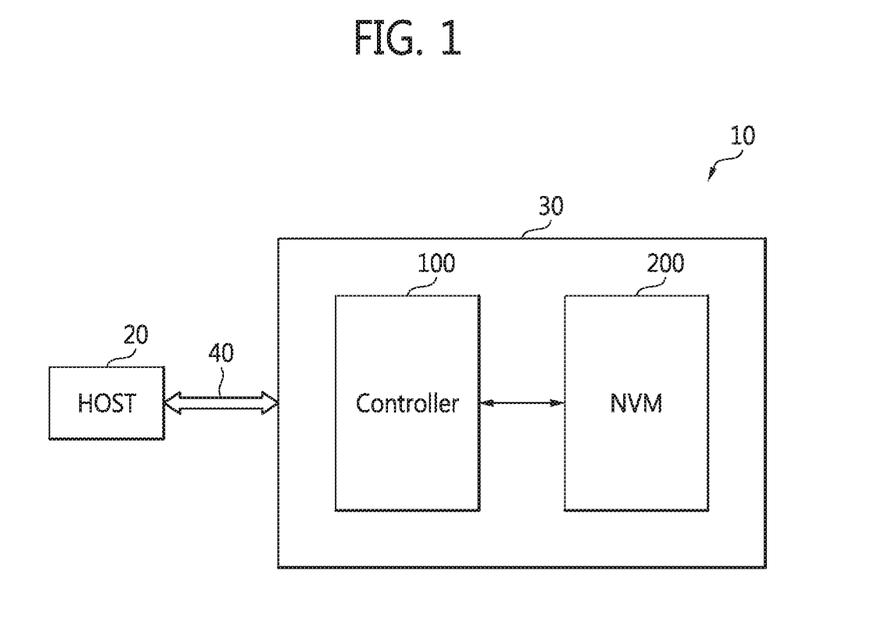
FIG. 1 is a block diagram of a data processing system according to some example embodiments of the inventive concepts.
Figure 2:
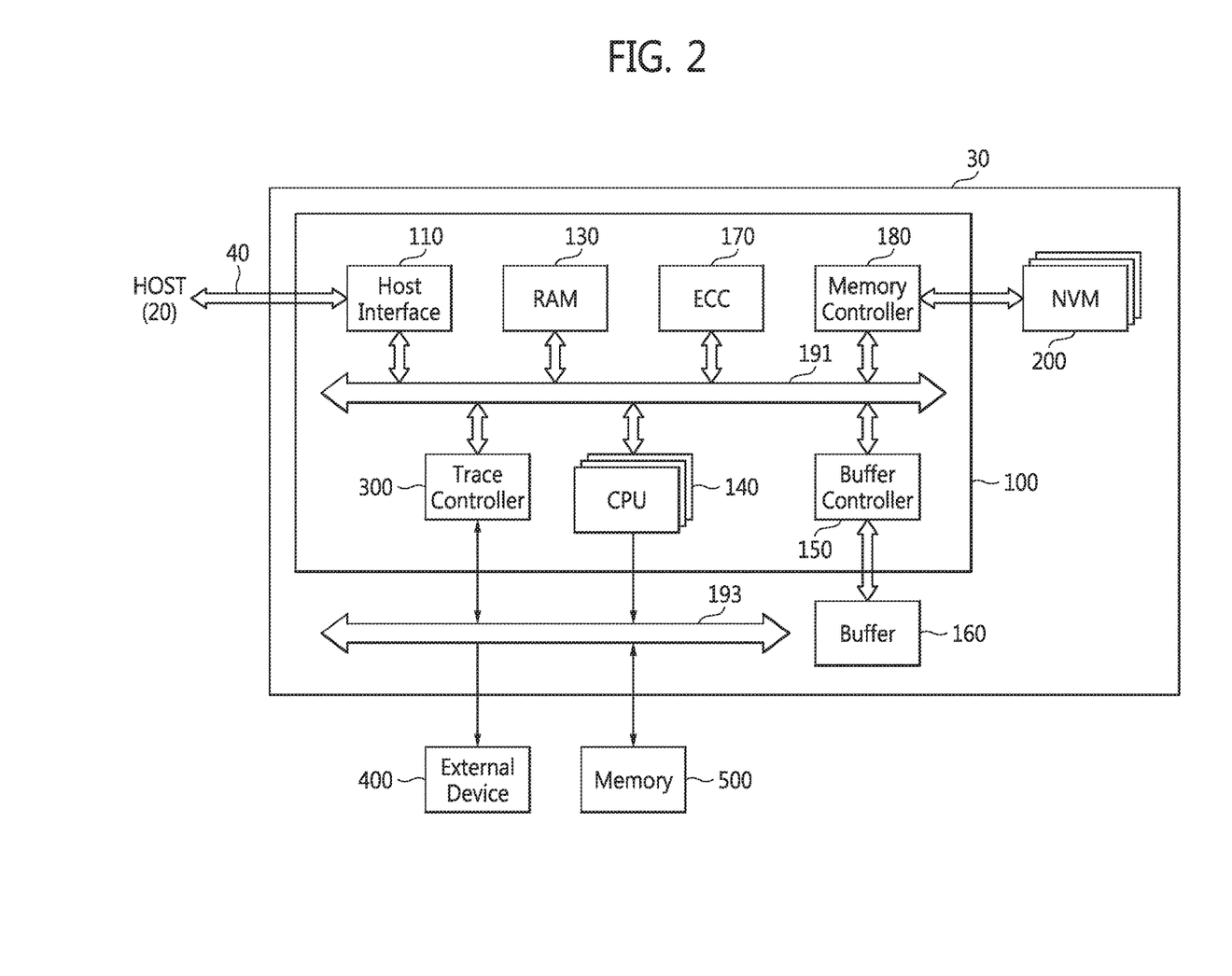
FIG. 2 is a block diagram of a data storage device according to some example embodiments of the inventive concepts.

FIG. 1 is a block diagram of a data processing system according to some example embodiments of the inventive concepts. FIG. 2 is a block diagram of a data storage device according to some example embodiments of the inventive concepts.

Referring to FIGS. 1 and 2, a data processing system 10 according to some example embodiments of the inventive concepts may include a host 20 and a data storage device 30 for exchanging commands and/or data with the host 20 through an interface 40.

According to some example embodiments, the data processing system 10 may be implemented as, but is not limited to, a personal computer (PC), a desktop computer, a workstation, a data center, an Internet data center (IDC), a storage area network (SAN), network attached storage (NAS) or a mobile computing device.

The mobile computing device may be implemented as, but is not limited to, a lap-top computer, a mobile phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile Internet device (MID), a wearable computer, an Internet of things (IoT) device, an Internet of everything (IoE) device, a drone, or an electronic book (e-book).

The interface 40 may be implemented as, but is not limited to, a serial advanced technology attachment (SATA) interface, a SATA express (SATAe) interface, a Serial Attached Small computer system interface (SCSI) (SAS) interface, a peripheral component interconnect express (PCIe) interface, a non-volatile memory express (NVMe) interface, an advanced host controller interface (AHCI), or a multimedia card (MMC) interface. According to some example embodiments, the interface 40 may transmit electrical signals or optical signals.

The host 20 may control a data processing operation (e.g. a write operation or a read operation) for the data storage device 30 through the interface 40.

The data storage device 30 may include a controller 100 and a plurality of (two or more) nonvolatile memories 200. The data storage device 30 may further include a buffer 160. According to some example embodiments, the data storage device 30 may be configured to communicate with the host 20 using a joint test action group (JTAG) protocol.

The data storage device 30 may be implemented as, but is not limited to, a flash memory-based memory device. For example, the data storage device 30 may be implemented as, but is not limited to, a solid-state drive or solid-state disk (SSD), an embedded SSD (eSSD), universal flash storage (UFS), a multimedia card (MMC), an embedded MMC (eMMC) or a managed NAND memory.

The flash memory-based memory device may include a memory cell array. The memory cell array may include a plurality of memory cells. For example, the memory cell array may include a two-dimensional (2D) memory cell array or a three-dimensional (3D) memory cell array.

The 3D memory cell array may be monolithically formed in one or more physical levels of arrays of memory cells having an active area disposed on or above a silicon substrate, and may include a circuit related to the operation of the memory cells. The circuit may be formed inside or on (or above) the substrate. The term "monolithic" means that the layers of each level of an array are directly deposited on the layers of each underlying level of the array. The 3D memory cell array may include vertical NAND strings that are vertically oriented such that at least one memory cell is located over another memory cell. The at least one memory cell may include a charge trap layer.

The controller 100 may control the transmission or processing of commands and/or data which are exchanged between the host 20, the buffer 160, and the nonvolatile memory 200. According to some example embodiments, the controller 100 may be implemented as a package including an IC, SoC, or electronic circuits.

The controller 100 according to the embodiment of FIG. 2 may include a host interface 110, a random access memory (RAM) 130, a Central Processing Unit (CPU) 140, a buffer controller 150, an error correction code (ECC) circuit 170, a memory controller 180, first bus architecture 191, second bus architecture 193, and a trace controller 300.

The host interface 110 may change the format of a response and/or data to be transmitted to the host 20 and may transmit the response and/or data having the changed format to the host 20 through the interface 40. Further, the host interface 110 may receive commands and/or data from the host 20, change the format of the received commands and/or data, and transmit the commands and/or data having the changed format to the CPU 140 and/or the buffer controller 150. According to some example embodiments, the host interface 110 may include a transceiver capable of transmitting and receiving signals and/or data.

The structure and operation of the host interface 110 may be implemented in conformity with the structure and operation of the interface 40. For example, the host interface 110 may be implemented as, but is not limited to, a SATA interface, a SATAe interface, an SAS interface, a PCIe interface, an NVMe interface, an AHCI, an MMC interface, a NAND-type flash memory interface, or a NOR-type flash memory interface.

The RAM 130 may store data required for the operation of the controller 100 or data generated via a data processing operation (e.g. a write operation or a read operation) performed by the controller 100.

The CPU 140 may control the operations of the host interface 110, the RAM 130, the buffer controller 150, the ECC circuit 170, the memory controller 180, and the trace controller 300 through the first bus architecture 191. Further, the CPU 140 may output data, generated during the operation, to an external device 400, may write the data to an external memory 500 or may read data from the external memory 500, through the second bus architecture 193.

Here, each of the first bus architecture 191 and the second bus architecture 193 may be implemented as, but is not limited to, advanced microcontroller bus architecture (AMBA), an advanced high-performance bus (AHB), an advanced peripheral bus (APB), an advanced extensible interface (AXI), an advanced system bus (ASB), or AXI coherency extensions (ACE), or a combination thereof.

The CPU 140 may include one or more CPUs, and each CPU may include a core and a trace circuit corresponding thereto.

The CPU 140 may receive a command from the host 20, and may perform a data processing operation corresponding to the received command. According to some example embodiments, the CPU 140 may perform the operation of controlling components included in the controller 100 in response to a first command transmitted from the host 20, and may perform a trace operation on the core in response to a second command transmitted from the host 20. The configuration and operation of the CPU 140 will be described in detail later with reference to FIG. 3.

The buffer controller 150 may write data to the buffer 160 or read data from the buffer 160 under the control of the CPU 140. The buffer controller 150 may be referred to as a 'controller' or a 'buffer manager', which is capable of controlling a write operation and a read operation for the buffer 160.

Further, the buffer controller 150 may directly perform data processing operations (e.g. write operations or read operations), corresponding to respective commands (e.g. write commands or read commands) stored in the RAM 130, with the buffer 160 via direct memory access (DMA). Each of the data processing operations may be processed on a per-DMA basis.

The buffer 160 may write data received from the host 20 or read data stored therein under the control of the buffer controller 150. According to some example embodiments, the buffer 160, which may be implemented as a volatile memory device, may be implemented as, but is not limited to, a buffer memory, a RAM, a static RAM (SRAM), or a dynamic RAM (DRAM).

According to some example embodiments, when the controller 100 and the buffer 160 are implemented as different semiconductor chips, they may be integrated into a single package, for example, a package-on-package (PoP), a multi-chip package (MCP) or a system-in package (SiP), but the type of package is not limited to these examples. For example, a first chip including the buffer 160 may be stacked above a second chip including the controller 100 through stack balls.

The ECC circuit 170 may perform an Error Correction Code (ECC) operation on data which is output from the controller 100 and is to be stored in the nonvolatile memory 200, or may perform an ECC operation on data, which is output from the nonvolatile memory 200.

The memory controller 180 may write data to the nonvolatile memory 200 or read data from the nonvolatile memory 200 under the control of the CPU 140. For example, when the nonvolatile memory 200 is implemented as a flash memory, the memory controller 180 may perform a function of a flash memory controller.

The nonvolatile memory 200 may be implemented as, but is not limited to, a flash memory (e.g. a NAND flash memory or a NOR flash memory).

The trace controller 300 may control a trace operation performed by the CPU 140 based on the result of performing at least one authentication control operation in response to a second command transmitted from the host 20. Here, the trace operation denotes the operation of outputting, in real time, pieces of information that are generated while cores (or firmware running on the cores) included in the CPU 140 process a first command transmitted from the host 20.

The trace controller 300 may output the pieces of information to the external device 400 and/or the external memory 500 based on the result of performing the at least one authentication control operation.

The external device 400 may be connected to the controller 100 through a port (not shown) and may receive data generated based on the result of the trace operation performed by the CPU 140.

The external memory 500 may be implemented as a volatile memory and/or a nonvolatile memory. The volatile memory may be implemented as a RAM, an SRAM or a DRAM. The nonvolatile memory may be implemented as a hard disk drive (HDD), a NAND flash memory, a NOR flash memory, a phase change RAM (PRAM), a magnetoresistive RAM (MRAM), a spin-transfer torque magnetic random-access memory (STT-MRAM), a ferroelectric RAM (FRAM) or a resistive RAM (RRAM).

Figure 3:
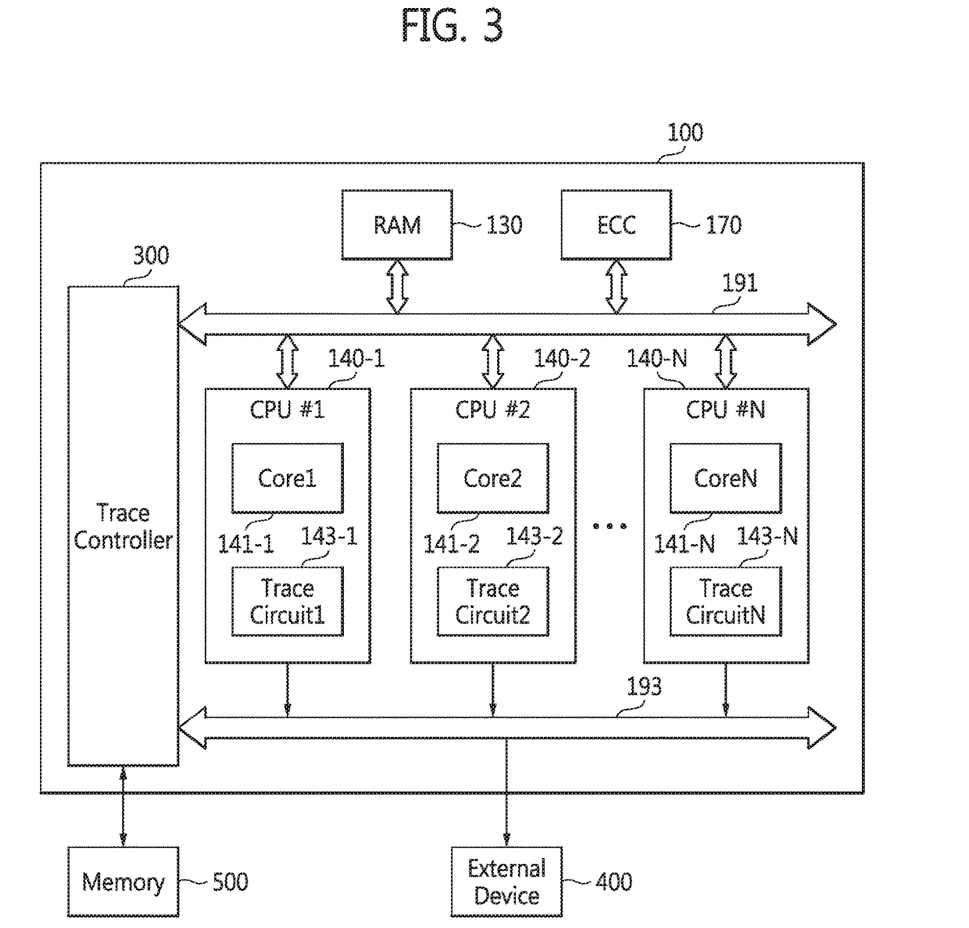
FIG. 3 is a block diagram for explaining the operation of a controller shown in FIG. 2.

FIG. 3 is a block diagram for explaining the operation of the controller shown in FIG. 2. Referring to FIGS. 1 to 3, the CPU 140 may include a plurality of CPUs 140-1, 140-2, . . . , 140-N (where N is an integer equal to or greater than 2), which include respective cores 141-1, 141-2, . . . , 141-N and trace circuits 143-1, 143-2, . . . , 143-N corresponding to the cores.

According to some example embodiments, the trace circuits 143-1, 143-2, . . . , 143-N are implemented in the form of hardware, and may also be implemented as a separate circuit outside the CPU 140, unlike the configuration shown in FIG. 3. In this case, the trace circuit may be configured to include one or more trace circuits and may perform a trace operation on the plurality of cores 141-1, 141-2, . . . , 141-N.

Each of the cores 141-1, 141-2, . . . , 141-N may receive a first command from the host 20 and perform a data processing operation corresponding to the received first command.

The plurality of trace circuits 143-1, 143-2, . . . , 143-N corresponding to respective cores 141-1, 141-2, . . . , 141-N may perform trace operations on the cores 141-1, 141-2, . . . , 141-N in response to a second command transmitted from the host 20. The trace circuits 143-1, 143-2, . . . , 143-N may perform trace operations in real time during the operations of the cores 141-1, 141-2, . . . , 141-N.

According to some example embodiments, each of the cores 141-1, 141-2, . . . , 141-N may control the operation of at least one trace circuit, among the trace circuits 143-1, 143-2, . . . , 143-N, through the first bus architecture 191. According to some example embodiments, each of the trace circuits 143-1, 143-2, . . . , 143-N may perform a trace operation on a core included in the corresponding CPU, among the CPUs 140-1, 140-2, . . . , 140-N.

The trace controller 300 may control the trace operations of the trace circuits 143-1, 143-2, . . . , 143-N based on the result of performing at least one authentication control operation corresponding to the second command transmitted from the host 20.

Under the control of the trace controller 300, the trace circuits 143-1, 143-2, . . . , 143-N may output trace data generated via the trace operations to the external device 400 through the second bus architecture 193.

Further, the trace controller 300 may encrypt the data output from the trace circuits 143-1, 143-2, . . . , 143-N through the second bus architecture 193 and output the encrypted data to the external memory 500. When encrypted data is read from the external memory 500, the trace controller 300 may perform the operation of decrypting the encrypted data.

Figure 4:
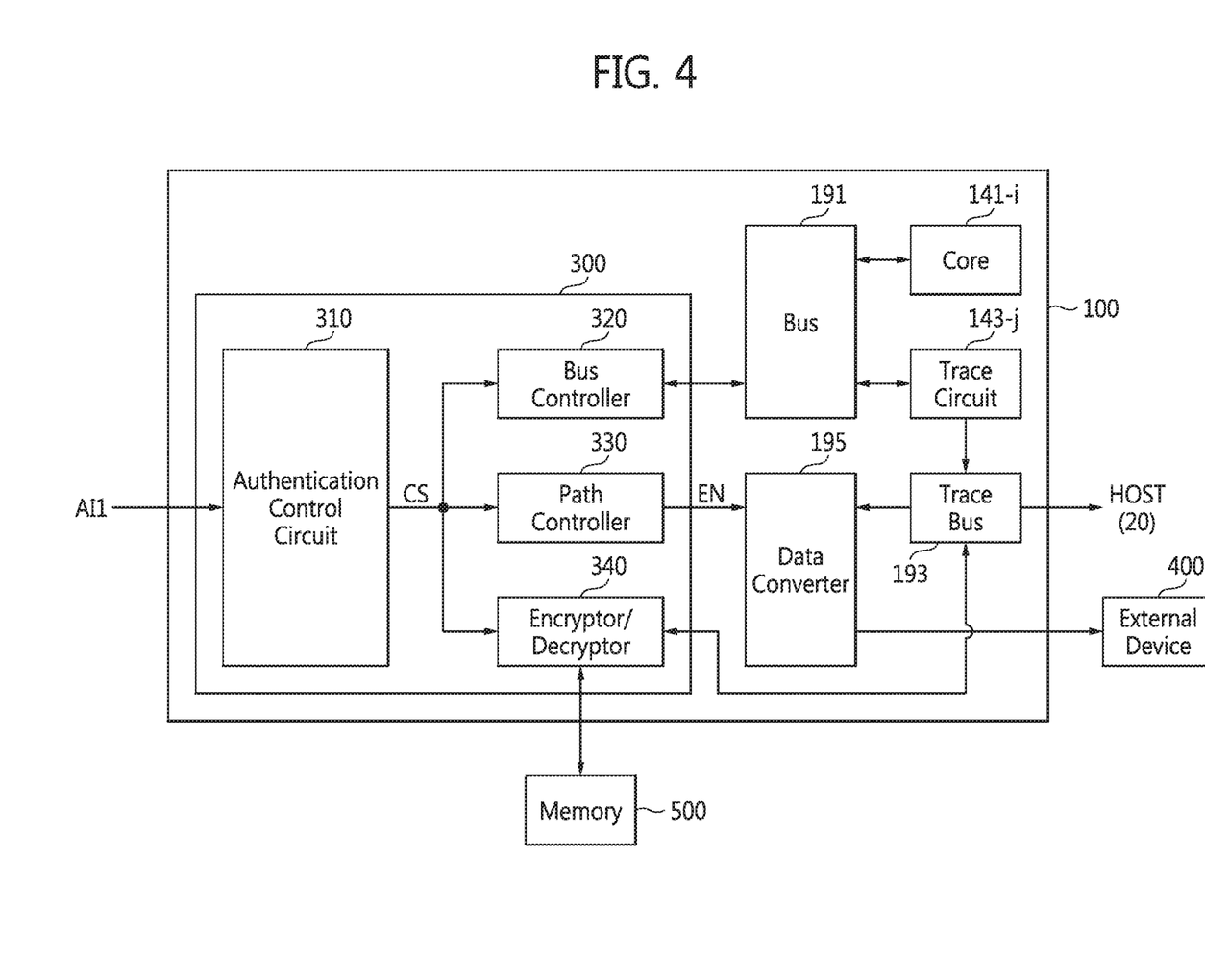
FIG. 4 is a block diagram showing an embodiment of a trace controller shown in FIG. 3.
Figure 5:
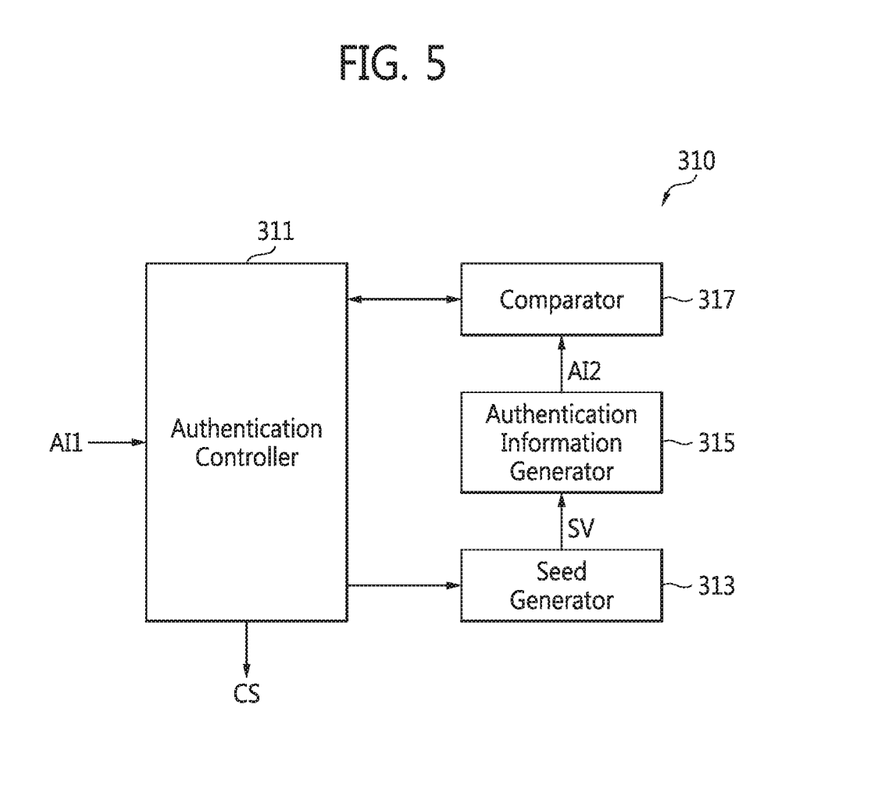
FIG. 5 is a block diagram showing an embodiment of an authentication control circuit shown in FIG. 4.

FIG. 4 is a block diagram showing an embodiment of the trace controller shown in FIG. 3. FIG. 5 is a block diagram showing an embodiment of the authentication control circuit shown in FIG. 4. In FIG. 4, the operations of one core 141-i (where i is an integer equal to or greater than 1), among the plurality of cores 141-1, 141-2, . . . , 141-N shown in FIG. 3, and one trace circuit 143-j (where j is an integer equal to or greater than 1), among the plurality of trace circuits 143-1, 143-2, . . . , 143-N, will be described by way of example.

Referring to FIGS. 1 to 5, the trace controller 300 may include an authentication control circuit 310, a bus controller 320, a path controller 330, and an encryptor/decryptor 340.

The authentication control circuit 310 may compare authentication information AI1 received from the host 20 corresponding to a command with internal authentication information and may output a control signal CS based on a comparison result. According to some example embodiments, the authentication control circuit 310 may include an authentication controller 311, a seed generator 313, an authentication information generator 315, and a comparator 317.

The authentication controller 311 may be configured to, when the authentication information AI1 is received from the host 20, control the seed generator 313 so as to generate internal authentication information and output the authentication information AI1 to the comparator 317.

The seed generator 313 outputs a preset seed value SV. The seed generator 313 may be configured to include a register, a laser fuse, or an electrical fuse and may output a preset constant or fuse value.

The authentication information generator 315 generates internal authentication information AI2 based on the result of applying the seed value SV to a predetermined algorithm, and outputs the generated internal authentication information AI2 to the comparator 317.

The comparator 317 compares the authentication information AI1 output from the authentication controller 311 with the internal authentication information AI2 output from the authentication information generator 315 to determine whether the authentication information AI1 is identical to the internal authentication information AI2, and outputs a comparison result to the authentication controller 311.

The authentication controller 311 may output an activated control signal CS when the pieces of authentication information AI1 and AI2 are identical to each other, based on the comparison result, and may output a deactivated control signal CS when the pieces of authentication information AI1 and AI2 are not identical to each other.

The bus controller 320 may control a path between the core 141-$i$ and the trace circuit 143-$j$ in response to the control signal CS.

The bus controller 320 may control the first bus architecture 191 so that the core 141-$i$ and the trace circuit 143-$j$ can communicate with each other when the activated control signal CS is output. That is, when the activated control signal CS is output, the trace circuit 143-$j$ may perform a trace operation on the core 141-$i$ under the control of the core 141-$i$.

The bus controller 320 may control the first bus architecture 191 so that the path between the core 141-$i$ and the trace circuit 143-$j$ is blocked when the deactivated control signal CS is output.

The path controller 330 may control a path between the trace circuit 143-$j$ and the external device 400 in response to the control signal CS. The path controller 330 may output an enable signal EN depending on whether the control signal CS has been activated.

For example, the path controller 330 may output an enable signal EN of '1' to a data converter 195 when the activated control signal CS is output from the authentication controller 311, and may output an enable signal EN of '0' to the data converter 195 when the deactivated control signal CS is output from the authentication controller 311.

In response to the enable signal EN of '1', the data converter 195 may output trace data, output from the trace circuit 143-$j$ through the second bus architecture (trace bus) 193, to the external device 400. In response to the enable signal EN of '0', the data converter 195 may output dummy data, instead of the trace data output from the trace circuit 143-$j$, to the external device 400.

The encryptor/decryptor 340 receives the trace data, output from the trace circuit 143-$j$ through the second bus architecture 193, encrypts the trace data, and outputs the encrypted data to the external memory 500. When encrypted data is received from the external memory 500, the encryptor/decryptor 340 may determine whether to perform a decryption operation on the encrypted data in response to the control signal CS.

For example, when the activated control signal CS is output, the encryptor/decryptor 340 may decrypt the encrypted data and output the decrypted data to the host 20 through the second bus architecture 193, whereas when the deactivated control signal CS is output, the encryptor/decryptor 340 may output the encrypted data to the host 20 through the second bus architecture 193 without decrypting the encrypted data.

According to some example embodiments, at least one of the plurality of cores 141-1, 141-2, . . . , 141-N may detect trace data either through the plurality of trace circuits 143-1, 143-2, . . . , 143-N or through the second bus architecture 193.

Figure 6:
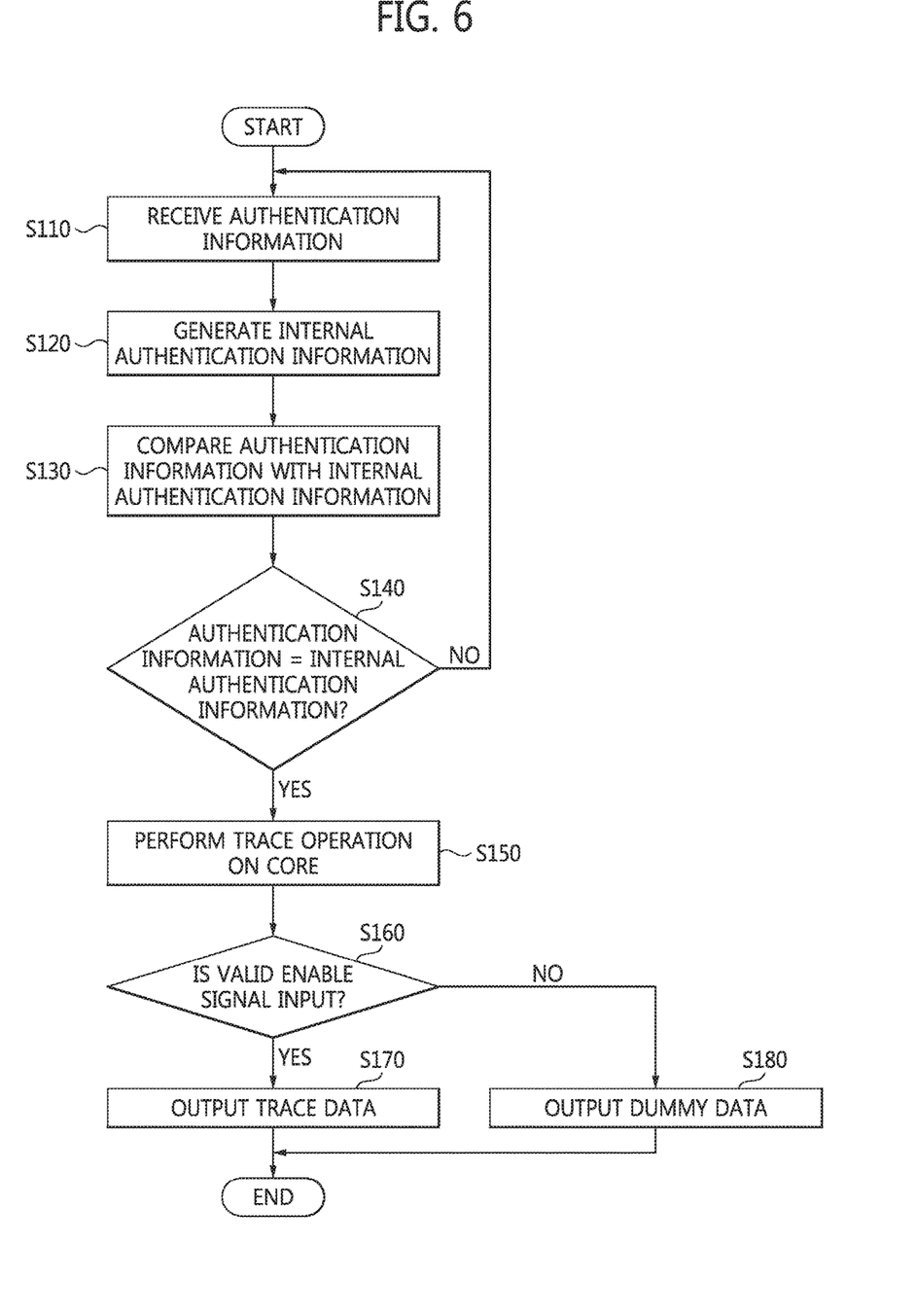
FIG. 6 is a flowchart showing a method of operating a data storage device according to some example embodiments of the inventive concepts.

FIG. 6 is a flowchart showing a method of operating the data storage device according to some example embodiments of the inventive concepts. Referring to FIGS. 2, 4, and 6, the authentication control circuit 310 receives authentication information AI1 from the host 20 in operation S110, and generates internal authentication information AI2 based on the result of applying a preset seed value SV to a predetermined algorithm in operation S120. The authentication control circuit 310 compares the authentication information AI1 with the internal authentication information AI2 in operation S130, and determines whether the pieces of authentication information AI1 and AI2 are identical to each other in operation S140.

If it is determined in operation S140 that the authentication information AI1 is identical to the internal authentication information AI2, the authentication control circuit 310 outputs an activated control signal CS.

When the activated control signal CS is output from the authentication control circuit 310, the trace circuit 143-$j$ may perform a trace operation on the core 141-$i$ under the control of the bus controller 320 in operation S150. In this regard, the trace circuit 143-$j$ outputs trace data, generated via the trace operation, to the data converter 195 through the second bus architecture 193.

The data converter 195 determines whether a valid enable signal EN, for example, an enable signal EN of '1', has been input from the path controller 330, in operation S160, and outputs the trace data to the external device 400 in operation S170 if it is determined that the valid enable signal EN has been input.

If it is determined in operation S160 that an invalid enable signal EN, for example, an enable signal EN of '0', has been input, the data converter 195 outputs dummy data to the external device 400 in operation S180.

Although the method of operating the data storage device, illustrated in FIG. 6, is shown as including a method of controlling the trace operation of the trace circuit 143-$j$ (including operations S110 to S150) and a method of controlling the output of the trace data (operations S160 to S180), the method is not limited to this example.

For example, only the method of controlling the trace operation of the trace circuit 143-$j$ may be performed or, alternatively, only the method of controlling the output of the trace data may be performed.

Figure 7A:
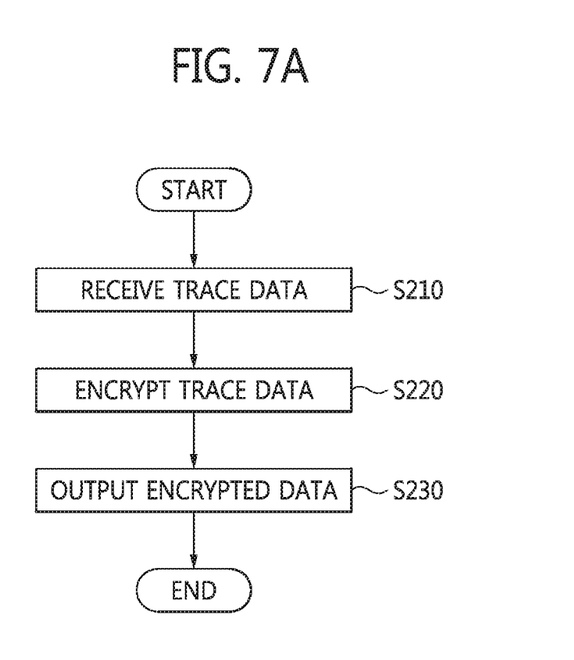
FIGS. 7A and 7B are flowcharts showing a method of operating a data storage device according to some example embodiments of the inventive concepts.
Figure 7B:
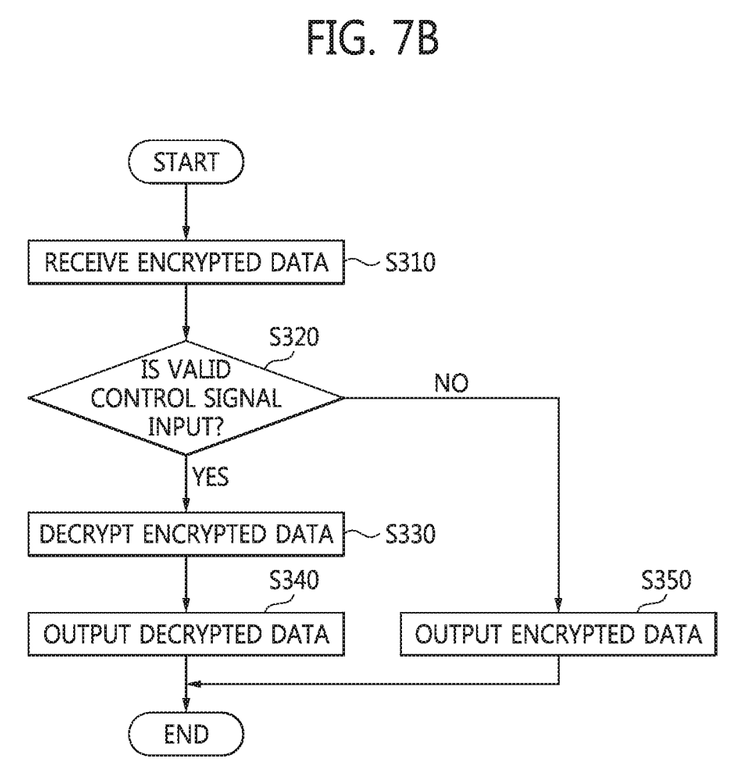

FIGS. 7A and 7B are flowcharts showing a method of operating the data storage device according to some example embodiments of the inventive concepts. In FIGS. 7A and 7B, the operation of the encryptor/decryptor 340 included in the trace controller 300 will be described. Similarly, the method of operating the data storage device, shown in FIGS. 7A and 7B, may be performed such that the method is included in the method of operating the data storage device, shown in FIG. 6, or may be independently performed regardless of the method of FIG. 6.

Referring to FIGS. 2, 4, and 7A and 7B, the encryptor/decryptor 340 receives trace data, output from the trace circuit 143-$j$ through the second bus architecture 193, in operation S210, and encrypts the received trace data in operation S220. The encryptor/decryptor 340 outputs the encrypted trace data to the external memory 500 in operation S230.

Next, the encryptor/decryptor 340 receives encrypted trace data from the external memory 500 in operation S310, and determines whether a valid control signal CS has been input from the authentication control circuit 310 in operation S320.

If it is determined that the valid control signal CS, for example, an activated control signal CS, has been input, the encryptor/decryptor 340 performs a decryption operation on the encrypted trace data in operation S330, and outputs decrypted trace data that is original trace data before it is encrypted, to the host 20 through the second bus architecture 193 in operation S340.

If it is determined in operation S320 that an invalid control signal CS, for example, a deactivated control signal CS, has been input, the encryptor/decryptor 340 outputs the encrypted trace data to the host 20 through the second bus architecture 193 in operation S350.

Figure 8:
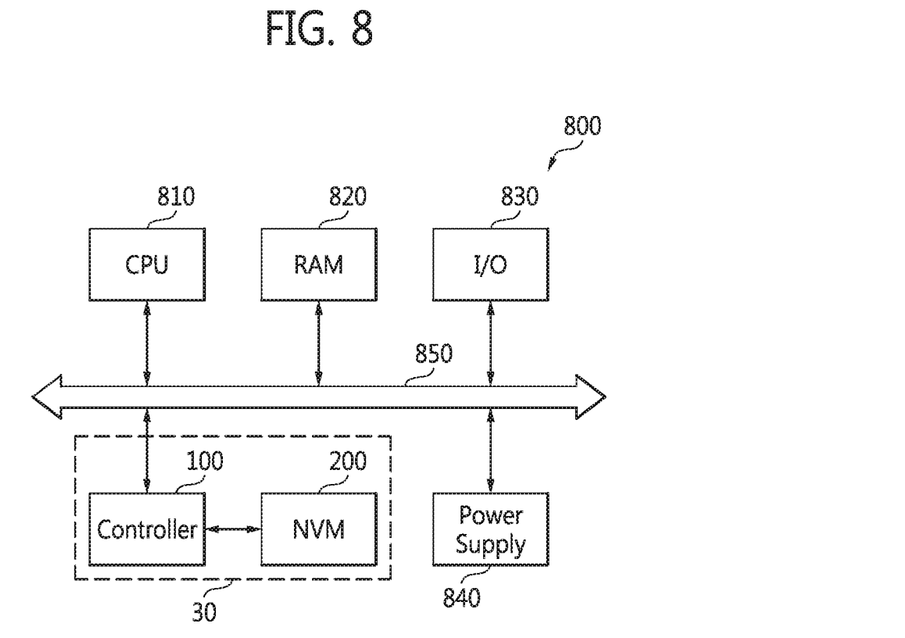
FIG. 8 is a block diagram showing an embodiment of an electronic system including a data storage device according to some example embodiments of the inventive concepts.

FIG. 8 is a block diagram showing an embodiment of an electronic system including the data storage device according to some example embodiments of the inventive concepts.

Referring to FIG. 8, an electronic system 800 may include a processor 810, a RAM 820, an input/output (I/O) device 830, a power supply 840, and a data storage device 30.

Meanwhile, although not shown in FIG. 8, the electronic system 800 may further include ports for communicating with a video card, a sound card, a memory card or a USB device, or with other electronic devices. The electronic system 800 may be implemented as a PC or as a portable electronic device, such as a notebook computer, a mobile phone, a personal digital assistant (PDA) or a camera.

As the data storage device 30 shown in FIG. 8, the data storage device 30 according to some example embodiments of the inventive concepts, shown in FIGS. 1 and 2, may be used.

The processor 810 may perform specific computations or tasks. According to some example embodiments, the processor 810 may be a microprocessor or a Central Processing Unit (CPU). The processor 810 may communicate with the RAM 820, the I/O device 830, and the data storage device 30 through a bus 850 such as an address bus, a control bus, or a data bus. According to some example embodiments, the processor 810 may also be connected to an expansion bus such as a peripheral component interconnect (PCI) bus.

The RAM 820 may store data required for the operation of the electronic system 800. For example, the RAM 820 may be implemented as a dynamic RAM (DRAM), a mobile DRAM, a Static RAM (SRAM), a phase change RAM (PRAM), a ferroelectric RAM (FeRAM), a magnetic RAM (MRAM) and/or a resistive memory (resistive RAM: RRAM or ReRAM).

The I/O device 830 may include an input means such as a keyboard, a keypad, or a mouse, and an output means such as a printer or a display. The power supply 840 may supply an operating voltage required for the operation of the electronic system 800.

Figure 9:
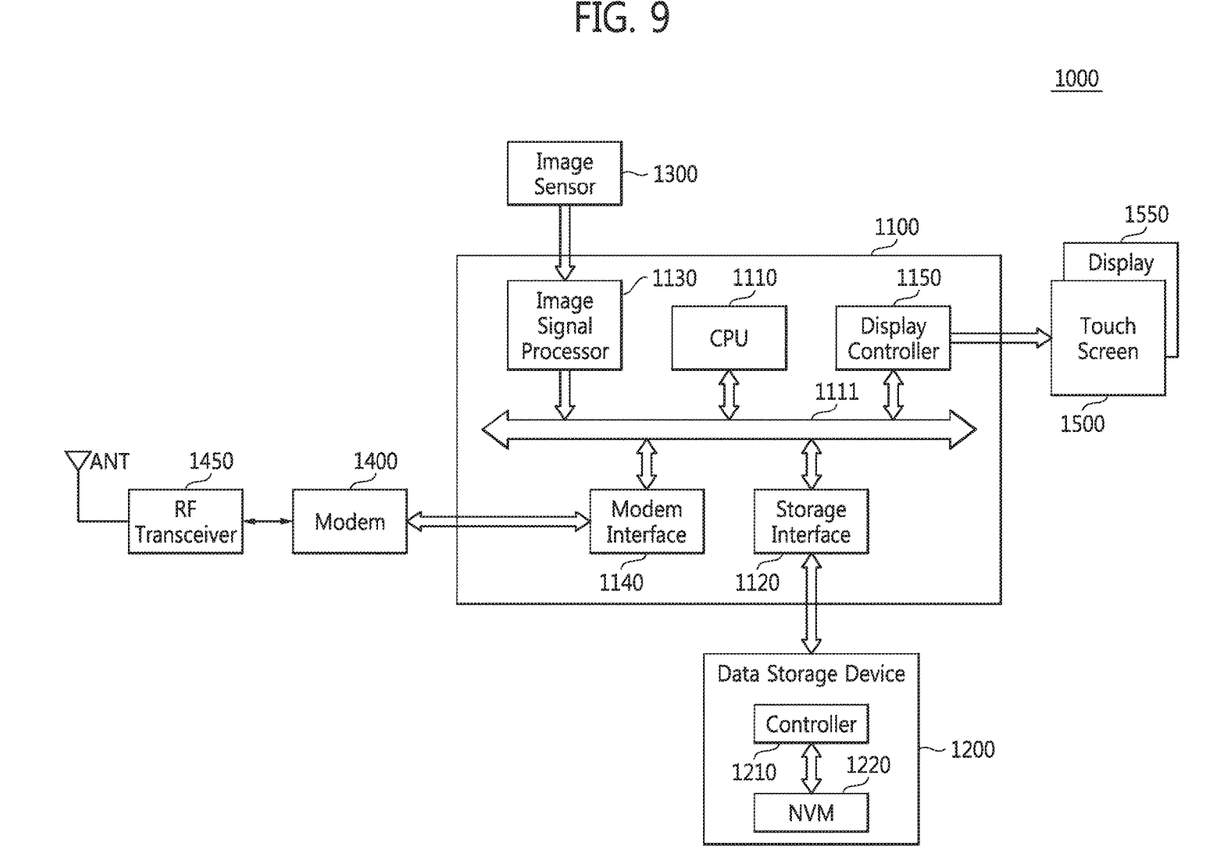
FIG. 9 is a block diagram of a data processing system according to some example embodiments of the inventive concepts.

FIG. 9 is a block diagram of a data processing system according to some example embodiments of the inventive concepts.

Referring to FIGS. 1 to 9, a data processing system 1000 may mean a mobile computing device 1000.

The mobile computing device may be implemented as a laptop computer, a mobile phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an Internet of things (IoT) device, an Internet of everything (IoE) device, or an e-book.

The data processing system 1000 may include an application processor (AP) 1100, a data storage device 1200, an image sensor 1300, a modem 1400, a Radio frequency (RF) transceiver 1450, and a display 1550 including a touch screen 1500.

The data storage device 1200 may mean the data storage device 30 shown in FIG. 1. A controller 1210 may mean the controller 100 of FIG. 1, and a nonvolatile memory 1220 may mean the nonvolatile memory 200 of FIG. 1.

The image sensor 1300 may generate image data by converting an optical image into an electrical signal.

The RF transceiver 1450 may transmit RF data received through an antenna ANT to the modem 1400. Further, the RF transceiver 1450 may convert data output from the modem 1400 into RF data and may transmit the RF data to the outside of the data processing system through the antenna ANT.

The modem 1400 may process data that is exchanged between the RF transceiver 1450 and the AP 1100.

The AP 1100 may control the data storage device 1200, the image sensor 1300, the modem 1400, the RF transceiver 1450, the touch screen 1500 and/or the display 1550.

The AP 1100 may be implemented as an IC, a system on chip (SoC) or a mobile AP.

The AP 1100 may include a CPU 1110, bus architecture 1111, a storage interface 1120, an image signal processor (ISP) 1130, a modem interface 1140, and a display controller 1150.

The CPU 1110 may control the storage interface 1120, the image signal processor 1130, the modem interface 1140, and the display controller 1150 through the bus architecture 1111.

The bus architecture 1111 may be implemented as, but is not limited to, advanced microcontroller bus architecture (AMBA), an advanced high-performance bus (AHB), an advanced peripheral bus (APB), an advanced extensible interface (AXI) or an advanced system bus (ASB).

The storage interface 1120 may control the processing and/or transmission of data that is exchanged with the data storage device 1200, under the control of the CPU 1110.

The ISP 1130 may receive and process the image data, output from the image sensor 1300, and transmit the processed image data to the bus architecture 1111.

The modem interface 1140 may control the processing and/or transmission of data that is exchanged with the modem 1400, under the control of the CPU 1110.

The display controller 1150 may transmit data to be displayed on the display 1550 to the display 1550, under the control of the CPU 1110. According to some example embodiments, the display controller 1150 and the display 1550 may exchange data with each other through a Mobile Industry Processor Interface (MIPI)® display serial interface. According to other example embodiments, the display controller 1150 and the display 1550 may exchange data with each other through an embedded Display Port (eDP).

The touch screen 1500 may transmit user input that enables the operation of the data processing system 1000 to be controlled to the AP 1100. The user input may be generated when the touch screen 1500 of the data processing system 1000 is touched. The CPU 1110 may control the operation of the AP 1100, the image sensor 1300, and/or the display 1550 depending on the user input transmitted from the touch screen 1500.

Figure 10:
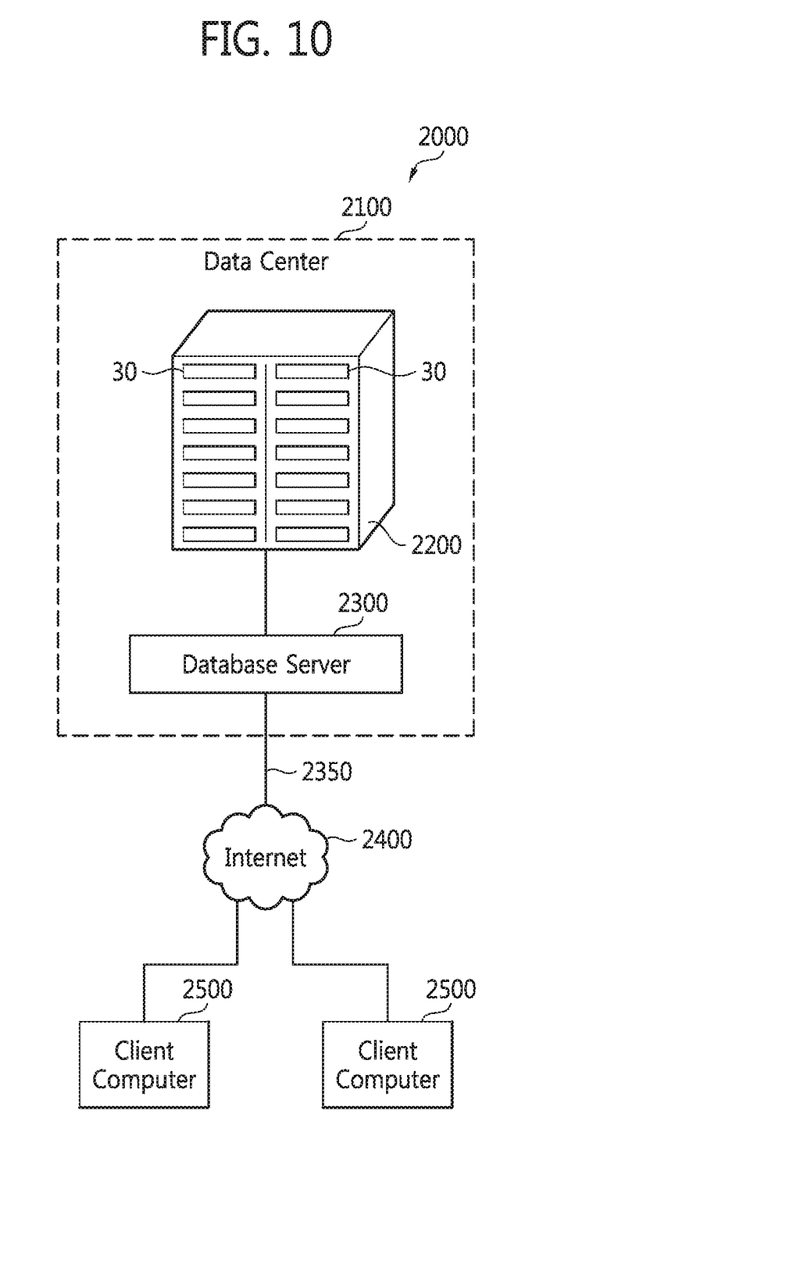
FIG. 10 is a block diagram of a data processing system according to other example embodiments of the inventive concepts.

FIG. 10 is a block diagram of a data processing system according to other example embodiments of the inventive concepts.

Referring to FIGS. 1 to 10, a data processing system 2000 may include a database (DB) 2200, a DB server 2300, a second network 2400, and a plurality of client computers 2500.

A data center, an Internet data center or a cloud data center 2100 may include the DB 2200 and the DB server 2300.

The DB 2200 may include a plurality of data storage devices 30. The data storage devices 30 may be installed in a rack. The structures and operations of respective data storage devices 30 are substantially identical or similar to those of the data storage device 30 described above with reference to FIGS. 1 to 5.

The DB server 2300 may control the operation of each of the data storage devices 30. The DB server 2300 may access the second network 2400, for example, the Internet, over a first network, for example, a Local Area Network (LAN).

Each of the client computers 2500 may access the DB server 2300 over the second network 2400.

In accordance with the example embodiments of the inventive concepts, there is an advantage in that a data storage device accesses the trace operation of a processor via authentication control, thus improving security.

While the inventive concepts has been particularly shown and described with reference to non-limiting example embodiments thereof, it will be understood by those of ordinary skill in the art that various changes in forms and details may be made therein without departing from the spirit and scope of the inventive concepts as defined by the following claims.

What is claimed is:

1. A data storage device comprising:
a nonvolatile memory; and
a controller configured to receive first and second commands generated by a host and control an operation of the nonvolatile memory in response to the first command,
wherein the controller includes,
a core configured to receive and process the first command;
a trace circuit corresponding to the core and configured to generate and output first data, based on pieces of information generated while the core processes the first command; and
a trace controller configured to control the trace circuit to generate the first data and control output of the first data and second data differing from the first data, based on a result of performing at least one authentication control operation for comparing authentication information with internal authentication information corresponding to the second command.

2. The data storage device of claim 1, further comprising:
a first bus and a second bus,
wherein the trace circuit is configured to communicate with the core through the first bus and is configured to transmit the first data through the second bus, and
wherein the trace controller is configured to block at least one path formed through the first bus and the second bus, based on a result of performing the at least one authentication control operation.

3. The data storage device of claim 1, wherein:
the second data comprises dummy data, and
the trace controller is configured to control output of the first data and the second data such that the first data or the second data is output to an external device based on the authentication information received from the host in response to the second command.

4. The data storage device of claim 3, wherein:
the second data includes data generated by encrypting the first data,
the trace controller is configured to output the second data to an external memory device, and then determine whether to decrypt the second data received from the external memory device, based on the authentication information received from the host in response to the second command.

5. The data storage device of claim 4, wherein the trace controller comprises:
an authentication control circuit configured to output a control signal based on a result of comparing the authentication information with the internal authentication information;
a bus controller configured to control a first path between the core and the trace circuit in response to the control signal; and
a path controller configured to control a second path between the trace circuit and the external device in response to the control signal.

6. The data storage device of claim 5, wherein the trace controller further comprises:
an encryptor/decryptor configured to receive and encrypt the first data and to output encrypted first data to the external memory device, and to determine whether to perform a decryption operation on the encrypted first data received from the external memory device in response to the control signal.

7. The data storage device of claim 6, wherein the controller further comprises a data converter configured to output the first data or dummy data to the external device in response to an enable signal output from the path controller.

8. The data storage device of claim 6, wherein the authentication control circuit comprises:
a seed generator configured to output a preset seed value;
an authentication information generator configured to generate the internal authentication information based on a result of applying the seed value to a predetermined algorithm; and
an authentication controller configured to activate the control signal based on a result of comparing the authentication information corresponding to the second command with the internal authentication information.

9. The data storage device of claim 8, wherein:
the trace controller is further configured to perform the at least one authentication control operation based on whether the control signal has been activated, and
the at least one authentication control operation comprises a first control operation of blocking the first path and a second control operation of blocking the second path when a deactivated control signal is output from the authentication controller.

10. The data storage device of claim 9, wherein the at least one authentication control operation further comprises a third control operation of blocking a decryption operation on encrypted first data received from the external memory device when a deactivated control signal is output from the authentication controller.

11. The data storage device of claim 1, wherein the controller further comprises:
a plurality of cores including the core; and
a plurality of trace circuits including the trace circuit,
wherein each of the plurality of cores controls an operation of one of the plurality of trace circuits, and
wherein each of the plurality of trace circuits controls a trace operation of a corresponding core of the plurality of cores.

12. A data processing system comprising:
a host; and
a data storage device connected to the host, the data storage device includes,
a nonvolatile memory; and
a controller configured to receive a command generated by the host and control an operation of the nonvolatile memory in response to the command, the controller includes,
a core configured to receive and process the command;
a trace circuit corresponding to the core and configured to perform a trace operation on the core in real time during an operation of the core; and
a trace controller configured to control the trace circuit to perform the trace operation and control the trace operation of the trace circuit, based on a result of performing at least one authentication control operation for comparing authentication information with internal authentication information corresponding to the command.

13. The data processing system of claim 12, wherein the trace operation comprises an operation of generating and outputting first data, based on pieces of information generated during the operation of the core.

14. The data processing system of claim 12, wherein
the data storage device further comprises a first bus and a second bus,
the trace circuit is configured to communicate with the core through the first bus and transmits first data through the second bus, and
the trace controller is configured to block at least one path formed through the first bus and the second bus, based on a result of performing the at least one authentication control operation.

15. The data processing system of claim 14, wherein the at least one authentication control operation, based on a result of comparing the authentication information received from the host with the internal authentication information, comprises:
a first control operation of blocking a first path between the trace circuit and the core;
a second control operation of blocking a second path between the trace circuit and an external device; and
a third control operation of blocking a decryption operation on encrypted first data when the encrypted first data is received from an external memory device.

16. A controller for a data storage device comprising:
a trace circuit configured to generate trace data;
an authentication control circuit configured to receive authentication information from a host and output a control signal; and
an encryptor/decryptor configured to
receive and encrypt the trace data,
output the encrypted trace data to a memory,
receive the encrypted trace data from the memory,
decrypt the encrypted trace data received from the memory,
determine whether the control signal is valid, and
output one of the encrypted trace data received from the memory and the decrypted trace data based on a result of the determination.

17. The controller of claim 16, wherein the encryptor/decryptor is configured to output the decrypted trace data if the control signal is determined valid.

18. The controller of claim 16, further comprising:
a path controller configured to
determine whether the control signal is valid, and
output an enable signal based on a result of the determination; and
a data converter configured to
receive the trace data, and
output dummy data or the trace data to an external device in response to the enable signal output from the path controller.

19. The controller of claim 16, further comprising:
a core configured to
receive a command from the host, and
perform a data processing operation corresponding to the command; and wherein
the trace circuit is further configured to perform trace operations on the core, and generate the trace data based on pieces of information generated while the core processes the command.

20. The controller of claim 19, further comprising:
a bus electrically connecting the trace circuit and the core; and
a bus controller configured to
determine whether the control signal is valid, and
block at least one path formed by the bus based on the bus controller determines whether the control signal is valid.

* * * * *